(12) United States Patent
Spencer et al.

(10) Patent No.: US 7,151,767 B2
(45) Date of Patent: Dec. 19, 2006

(54) METHOD AND APPARATUS FOR SYNCHRONIZING FREQUENCY HOPPING TRANSCEIVERS

(75) Inventors: Adrian G. Spencer, Horley (GB); Paul R. Marshall, Redhill (GB); Anthony D. Sayers, Crawley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1056 days.

(21) Appl. No.: 10/024,779

(22) Filed: Dec. 20, 2001

(65) Prior Publication Data

US 2002/0080769 A1 Jun. 27, 2002

(30) Foreign Application Priority Data

Dec. 27, 2000 (GB) .................................. 0031619.0

(51) Int. Cl.
*H04J 1/00* (2006.01)
(52) U.S. Cl. ...................... 370/343; 370/507; 375/132; 455/502
(58) Field of Classification Search ................ 370/350, 370/324, 503, 345, 330, 339, 338, 349, 328, 370/401, 428, 351, 347, 341, 329, 254, 235, 370/445, 344, 465, 337, 478, 480, 310, 310.1, 370/310.2, 389, 311, 395.1, 395.5, 395.51, 370/395.52, 395.53, 395.54, 395.65, 409, 370/463, 475, 414, 352–356, 395.61, 468, 370/333, 343, 507, 192.2, 69, 451, 452, 454; 455/38.3, 101, 502, 561, 500, 447, 450, 456, 455/509, 513, 62, 63, 71, 260, 161.1, 255–257; 375/132, 133, 135, 136, 354, 356; 379/93.09
See application file for complete search history.

(56) References Cited

U.S. PATENT DOCUMENTS 4,716,573 A * 12/1987 Bergstrom et al. .......... 375/132
5,377,222 A * 12/1994 Sanderford, Jr. ............ 375/131
5,657,317 A * 8/1997 Mahany et al. ............. 370/338
5,719,857 A * 2/1998 Heikkinen ................... 370/330
5,726,984 A * 3/1998 Kubler et al. ............... 370/349
5,737,359 A * 4/1998 Koivu ........................ 375/133

(Continued)

FOREIGN PATENT DOCUMENTS

GB 2313984 6/1993

(Continued)

OTHER PUBLICATIONS

Bluetooth Specification, Version 1.0, Radio Specification.

(Continued)

*Primary Examiner*—Ricky Q. Ngo
*Assistant Examiner*—Jamal A. Fox
(74) *Attorney, Agent, or Firm*—Aaron Waxler; Paul Im

(57) ABSTRACT

A slave radio transceiver for use in a frequency hopping radio system synchronizes by receiving on a sequence of simultaneous combinations of radio channels until a paging message is received from a master transceiver, and may then revert to single channel frequency hopping operation. The slave's multi-channel receiver is sub-equipped to receive simultaneously on a only sub-set (PF12, PF13) of the channels within its bandwidth, the received channels being selected by independent programming within the bandwidth. The channels received simultaneously may be selected to correspond to different degrees of misalignment between the master and slave.

17 Claims, 2 Drawing Sheets

U.S. PATENT DOCUMENTS

Figure 1:
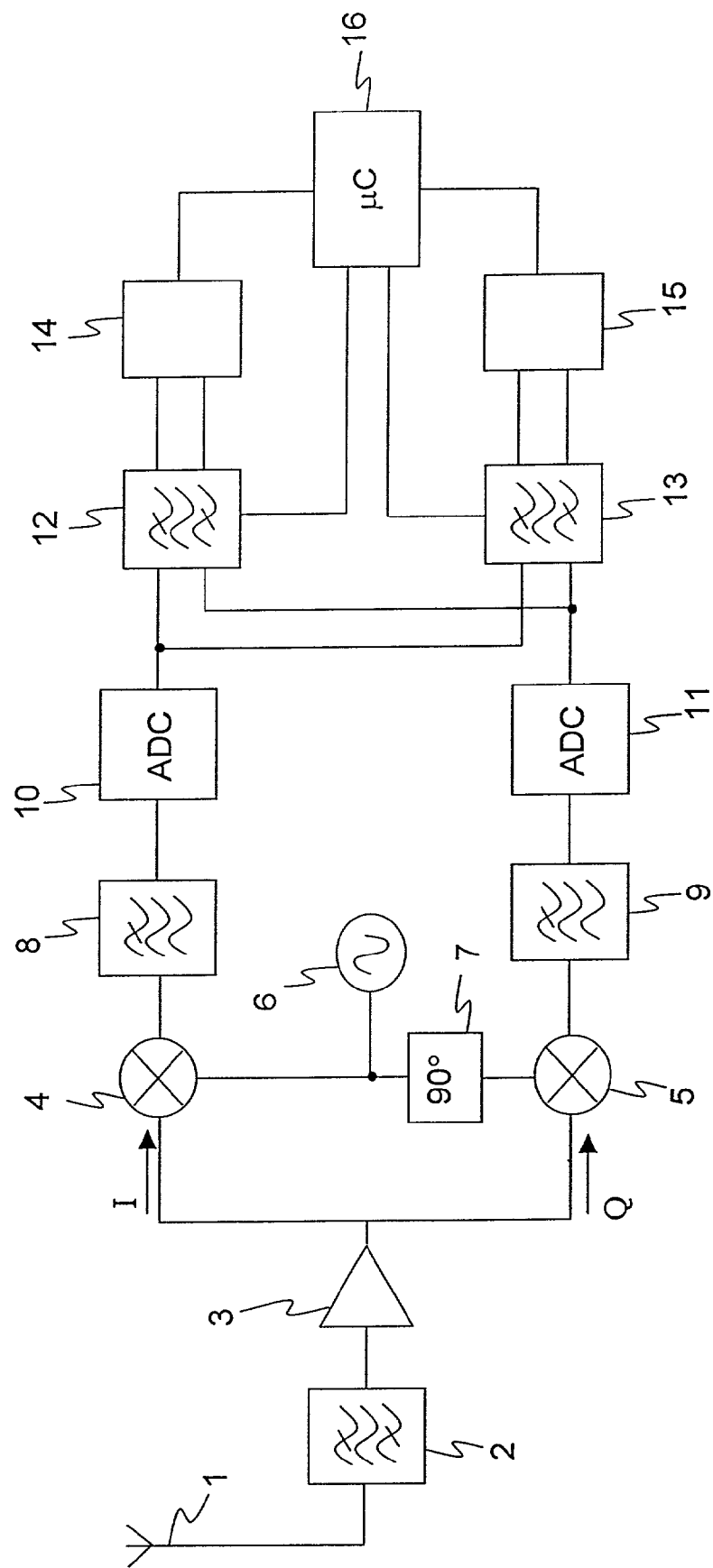

| | | | |
|---|---|---|---|
| 5,790,536 A * | 8/1998 | Mahany et al. | 370/338 |
| 5,940,431 A * | 8/1999 | Haartsen et al. | 375/131 |
| 5,995,533 A * | 11/1999 | Hassan et al. | 375/140 |
| 6,009,332 A * | 12/1999 | Haartsen | 455/450 |
| 6,298,081 B1 * | 10/2001 | Almgren et al. | 375/132 |
| 6,335,953 B1 * | 1/2002 | Sanderford et al. | 375/344 |
| 6,389,010 B1 * | 5/2002 | Kubler et al. | 370/353 |
| 6,389,057 B1 * | 5/2002 | Haartsen | 375/132 |
| 6,405,048 B1 * | 6/2002 | Haartsen | 455/464 |
| 6,470,185 B1 * | 10/2002 | Kangas et al. | 455/456.1 |
| 6,937,582 B1 * | 8/2005 | Kronestedt | 370/329 |

FOREIGN PATENT DOCUMENTS

WO     WO9724817     12/1996

OTHER PUBLICATIONS

Bluetooth Specification, Version 1.0. Baseband Specification.

* cited by examiner

METHOD AND APPARATUS FOR SYNCHRONIZING FREQUENCY HOPPING TRANSCEIVERS

The present invention relates to a radio receiver for use in a frequency hopping radio system, a transceiver embodying such a receiver, an integrated circuit embodying such a receiver, and to a method of operating such a receiver, and has, for example, application to low power radio devices operating in unlicensed frequency bands.

In radio systems which use frequency hopping, radio transceivers repeatedly change frequency according to a predetermined sequence, dwelling on each frequency for only a short period. Provided that the transceivers are synchronised, they will always be tuned to the same frequency at the same time and therefore communication will be possible. When transceivers move out of range, or cease communication when, for example, adopting a power saving mode, the clocks in the transceivers will free run and will drift out of synchronisation. The amount of drift depends on the stability of the transceivers' clocks and the time elapsed since the previous communication. When communication is to be restarted, it is necessary to re-synchronise the transceivers.

In order to re-synchronise two transceivers, one of the transceivers must search through the radio channels in order to identify which channel the other transceiver is currently tuned to. If there is a large amount of drift between the clocks of the transceivers, it may be necessary to search through all radio channels used in the system. This can result in a long delay before communication is established, with consequently a poor service experienced by users. The transceiver being sought may also be frequency hopping through the radio channels, which compounds the search problem.

An example of a frequency band in which such a scenario may be found is the 2.4 GHz ISM frequency band, in which unlicensed, short range communication is permitted. One technology available for use in this frequency band is Bluetooth ["Bluetooth Specification" version 1.0, available at http://www.bluetooth.com]. A typical application for Bluetooth technology is the replacement of cables for communication between a mobile phone and a PC.

Using Bluetooth terminology, a "master device" may search for a "slave device" by transmitting a "page" message on each channel of a sequence of channels until it receives a "page response" message on a channel; the master and slave devices can then synchronise and communication can proceed. The Bluetooth specification prescribes an intelligent search strategy in which the master searches first on the frequency hops where the slave device is most likely to be found, based on an estimate of drift, and if unsuccessful then searches the less likely frequency hops. Bluetooth uses 32 channels for paging of which the master will classify, for the purpose of searching, 16 as group A (most likely) and 16 as group B (less likely). It may take 2.56 seconds to search through all group A and B frequencies, and this time may be extended if the master is performing the search on a network which includes synchronous communication links.

An object of the present invention is to reduce in a cost effective manner the time required to synchronise the hop sequences of frequency hopping radio transceivers.

According to one aspect of the invention there is provided a method of synchronising the hop sequences of frequency hopping radio transceivers, comprising transmitting from a first transceiver a first message at least once on each of a first plurality of radio channels selected sequentially according to a first sequence at a first rate, receiving in a second transceiver on simultaneous combinations of radio channels selected sequentially from a second plurality of radio channels according to a second sequence at a second rate, wherein the first and second plurality of radio channels have at least partial commonality, and in response to receiving at the second transceiver the first message on any of the second plurality of radio channels, transmitting from the second transceiver a second message and aligning the hop sequences of the first and second transceivers.

By using a receiver capable of receiving simultaneously on more than one radio channel the search time elapsed before both first and second transceivers (the searching and the searched for) arrive on a common radio channel can be reduced.

In general, the hop rate of the first and second transceivers is not equal. For example, the first transceiver may transmit the first message on a plurality of channels sequentially during a period when the second transceiver receives on a single combination of channels without hopping. Alternatively, for example, the second transceiver may hop through a plurality of simultaneous channel combinations during a period when the first transceiver transmits the first message repeatedly on a single channel.

The channels in a combination of radio channels received simultaneously by the second transceiver may be selected to correspond to different degrees of drift. For example, if each combination comprises two channels, the two channels may be selected from positions in the hop sequence separated by around half the sequence period. In the case of Bluetooth equipment, each combination may comprise channels selected from the A group and B group.

The alignment of the hop sequences of the first and second transceivers may be performed by adjustment in either or both of the first and second transceivers.

According to a second aspect of the invention there is provided a radio receiver for use in synchronising the hop sequences of frequency hopping radio transceivers, comprising means for frequency hopping through a sequence of radio channels, means for simultaneous reception on a plurality of radio channels, means for demodulating a first message received on any of the plurality of radio channels, and means for transmitting a second message in response to receiving the first message.

Such a receiver may comprise a front end capable of receiving a radio signal on each of N (N>2) radio channels simultaneously, means for mixing simultaneously each of the N radio signals to respective IF frequencies, a plurality less than N of IF filters, means for tuning each of the plurality of IF filters to selected ones of the IF frequencies, and means for demodulating at least one signal received via at least one of the IF filters.

By using fewer than N IF filters, and by making those IF filters tuneable, the receiver cost can be lower than if an IF filter were provided for every IF frequency, and the IF filters may be tuned to those channels where a first message is most likely to be received. For example, in some radio systems these may be specifically designated paging channels. Furthermore, the channels where a first message is most likely to be received may be different for different transceivers.

After a first message has been received from the first transceiver, the second transceiver may revert to receiving only one channel at a time in order to minimise power consumption.

The full set of channels in a radio system may be scanned by stepwise tuning the cluster of N channels across the set of channels. As the receiver is tuned across the set of channels, the channels on which the first transceiver transmits the first message (paging channels) may be located at different positions within the received channel cluster. The tuneable IF filters can be tuned to select those channels where a first message is most likely to be received Optionally, the cluster of channels can be mixed down to a low IF, each channel being at a different IF frequency. Also optionally, one of the mixed down channels may be at a zero IF.

Optionally, low IF filtering can be implemented in polyphase filters which can be programmable to enable paging channels to be selected within the received channel cluster.

A receiver operating in accordance with the invention can be amenable to a high level of circuit integration.

Figure 2:
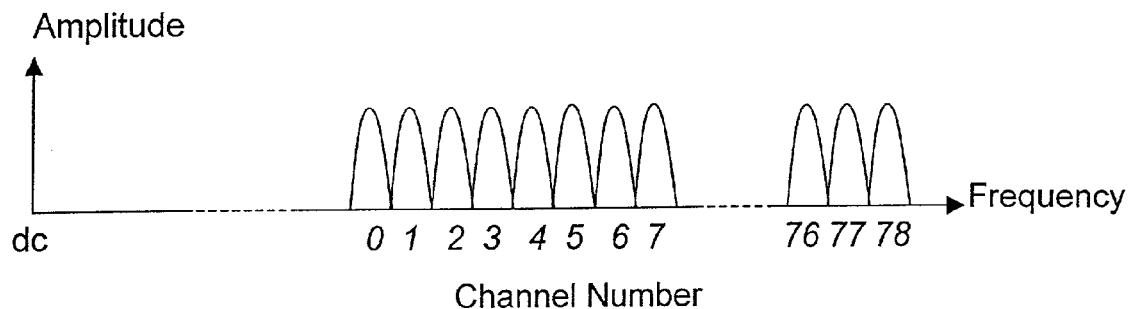
Figure 3:
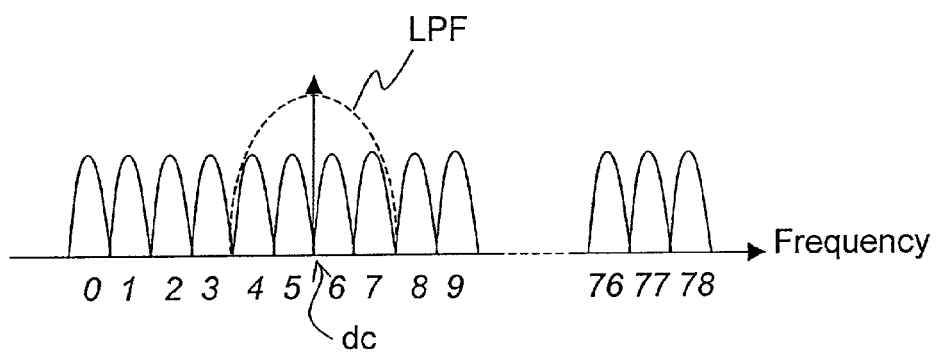
Figure 4:
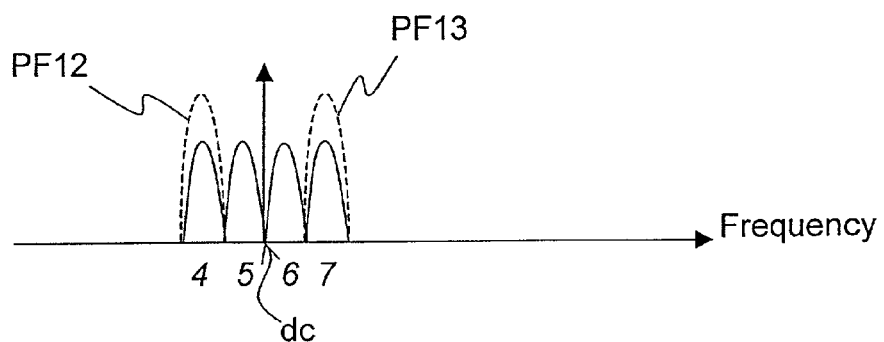

The present invention will now be described, by way of example application to Bluetooth devices, with reference to the accompanying drawings, wherein:

FIG. 1 is block schematic diagram of a receiver in accordance with the present invention, FIG. 2 illustrates diagrammatically the full set of radio channels available for use by a Bluetooth radio system, FIG. 3 illustrates diagrammatically the selection of a cluster of channels by filtering after frequency conversion, and FIG. 4 illustrates diagrammatically the selection of individual paging channels from a cluster by filtering.

When a Bluetooth transceiver device is not engaged in communication it will scan its receiver around a preset sequence of 32 paging channels listening for a page message transmitted by a master device, which indicates the commencement of a new communication and which enables the master and slave devices to synchronise. These paging channels comprise a 32 channel hopping sequence which is derived from the device's address and is different for different devices. The 32 channels are distributed across the 79 channels. The timing for performing the scan is controlled by an internal clock.

When a master device wishes to establish communication with a slave device after a period of no communication, it enters a paging mode transmitting a page request on those channels in the A group. The master device can estimate which channel the slave device may be tuned to, based on previous communication with that slave device, but if a long time has elapsed since the previous communication it is likely that their clocks will have drifted apart and for the estimate to be wrong, clock stability being nominally 30 ppm. Therefore if no page response message is received on the A group channels from the slave device, the master device transmits the page message on the B group channels. It may take 1.28 seconds to transmit on all the A group channels, and 1.28 seconds to transmit on all the B group channels; a total of 2.56 seconds. By using a receiver capable of receiving simultaneously an A and a B group channel, the master and slave device will arrive on a common frequency during the initial period of 1.28 seconds, thereby reducing the maximum time to synchronise. Note that, if a large drift has occurred, the master and slave will make different classifications of channels as A group channels and B group channels i.e. channel classified as an A group channel by the master may be classified as a B group channel by the slave.

A receiver embodying the present invention is illustrated in FIG. 1 and comprises an antenna 1 which is coupled to an RF bandpass filter 2 which selects the relevant band of frequencies. The signal output from the bandpass filter 2 is amplified by a low noise amplifier 3 and then is split into two paths I, Q, each of which has a mixer 4, 5. First inputs to the mixers 4, 5 are coupled to the output of the low noise amplifier 3. The second inputs of the mixers 4, 5 are provided by a local oscillator signal from an oscillator 6. The local oscillator signal supplied to the mixer 5 is phase shifted by nominally 90° relative to that supplied to the mixer 4 by means of a 90° phase shifter 7. The frequency of the local oscillator signal is approximately equal to the centre frequency of the cluster of channels of interest, thereby mixing the cluster of channels to be centred around zero frequency. The products of mixing are filtered by low pass filters 8, 9 to exclude channels outside of the cluster of interest, and then digitised in analogue-to-digital converters (ADCs) 10, 11. The digitised signals in the I and Q paths are both supplied to in-phase and quadrature inputs respectively of first and second channel filters 12 and 13 which may be polyphase filters. Each of the channel filters 12, 13 is independently programmable under the control of a controller 16 to select one channel. Any signal in each of the first and second channel filters 12, 13 is de-rotated to zero frequency, except where that signal is already at zero frequency, and demodulated in respective first de-rotator and demodulator 14 and second de-rotator and demodulator 15. Demodulated signals are supplied to controller 16 for further processing according to the Bluetooth protocol.

FIGS. 2–4 illustrate the channels and filtering in the receiver. Referring to FIG. 2, there are 79 channels available in the 2.4 GHz band for use by Bluetooth devices. Consider the situation of a master device that needs to establish communication with a slave device that uses for its 32 channel scan sequence the channels numbered 4, 7, 11 . . . etc, in an order predetermined by the scan sequence such that channel 4 and channel 7 are positioned apart by half the sequence length. Therefore, if the master estimates, using its internal clock, that the slave is currently tuned to channel 4 it would classify channel 4 as an A group channel, and channel 7 would be classified as a B group channel. Conversely, if the master and slave clocks have drifted such that the master estimates that the slave is currently tuned to channel 7, it would classify channel 7 as an A group channel, and channel 4 would be classified as a B group channel.

Referring again to FIG. 1, the RF bandpass filter 2 removes unwanted signals outside of the band of 79 channels. The 79 channels are frequency converted in the mixers 4 and 5 such that the centre of the cluster of channels of interest falls at zero frequency (dc). In this example the cluster comprises four channels, 4, 5, 6 and 7. The frequency converted channels are illustrated in FIG. 3. The selection of a desired cluster of channels to fall around dc can be controlled by suitable selection of the oscillator 6 frequency.

Low pass filters 8, 9 select the cluster of channels of interest. The low pass filtering is denoted LPF in FIG. 3, and the selected cluster of channels is illustrated in FIG. 4. The low pass filters 8, 9 protect the ADCs 10, 11 from unwanted signals, thereby reducing the dynamic range required by the ADCs.

Channel filters 12 and 13 are programmed under control of controller 16 to select channels 4 and 7 respectively. The filtering by channel filters 12 and 13 is denoted PF12 and PF13 respectively in FIG. 4.

Any signal received on channel 4 or 7 is derotated to dc and demodulated in respectively first and second derotator and demodulator 14, 15, and demodulated data is delivered to controller 16 for message processing.

If the demodulated data is a page message from the master device, the slave device transmits a page response message to the master device, can synchronise its hop sequence with the master device, and can disable all but one of the channel filters 12, 13 and de-rotators and demodulators 14, 15 in order to reduce power consumption.

If the slave device does not receive a page message on either channel 4 or channel 7, it can retune local oscillator 6 to down-convert a different cluster of 4 channels to be centred on dc and can re-program the channel filters 12, 13 to select another pair of channels within a cluster. Retuning and reprogramming continues until a page message is received from the master device.

It is possible that signals are received on more than one channel simultaneously, for example a page message from the master device on one channel and an unwanted signal from another device on another channel. To cater for this possibility the controller 16 can include means for selecting a wanted signal for further processing from among a plurality of signals received simultaneously on different channels.

In general, the cluster size is not limited to four channels but may contain any convenient number of channels.

In general, the number of programmable or tuneable channel filters is not limited to two. The number is a trade off between speed of establishing communication and the cost of the receiver.

In the example described, the cluster of channels is frequency converted to around dc. This minimises the sample rate required by the ADCs in a digital implementation. Conversion to other frequencies is also possible. It is also possible to frequency convert the cluster such that one channel is centred on dc.

What is claimed is:

1. A method of synchronising frequency hopping radio transceivers, comprising
    transmitting from a first transceiver a first message at least once on each of a first plurality of radio channels selected sequentially according to a first sequence;
    receiving in a second transceiver on simultaneous combinations of radio channels, said combinations having been selected sequentially from a second plurality of radio channels according to a second sequence, wherein the first and second plurality of radio channels have at least partial commonality, said radio channels of a simultaneous combination from among said combinations being received, in said receiving, simultaneously; and,
    in response to receiving at the second transceiver the first message on any of the second plurality of radio channels, transmitting from the second transceiver a second message and aligning hop sequences of the first and second transceivers.

2. A method as claimed in claim 1, wherein said simultaneous combination constitutes two radio channels.

3. A method as claimed in claim 2, wherein said second sequence has a period, said two radio channels being mutually separated by half said period.

4. A method as claimed in claim 1, further comprising a receiver of the second transceiver mixing N (N>2) radio channels to respective IF frequencies, tuning each of a plurality less than N of IF filters (12, 13) to selected ones of the IF frequencies corresponding to said radio channels of said simultaneous combination, receiving the first message via any of the IF filters, and demodulating the first message thereby received.

5. A method as claimed in claim 1, further comprising switching the second transceiver into a single-channel-at-a-time reception mode in response to receiving the first message.

6. A radio receiver for use in the method claimed in claim 1, comprising
    means for frequency hopping through a sequence of radio channels, means for simultaneous reception on a plurality of radio channels,
    means for demodulating a first message received on any of the plurality of radio channels, and
    means for transmitting a second message in response to receiving the first message.

7. A radio receiver as claimed in claim 6, comprising
    a front end (2, 3) capable of receiving a radio signal on each of N (N>2) radio channels simultaneously,
    means (4, 5, 6, 7) for mixing simultaneously each of the N radio signals to respective IF frequencies,
    a plurality less than N of IF filters (12, 13),
    means (16) for tuning each of the plurality of IF filters to selected ones of the IF frequencies, and
    means (14, 15) for demodulating at least one signal received via at least one of the IF filters.

8. A radio receiver as claimed in claim 7, wherein at least one respective IF frequency is a low IF.

9. A radio receiver as claimed in claim 8, wherein the IF filter (14, 15) tuned to the at least one low IF is a polyphase filter.

10. A radio receiver as claimed in claim 8, wherein at least one signal received via the at least one low IF is de-rotated to zero frequency prior to demodulation.

11. A radio receiver as claimed in claim 7, wherein at least one respective IF frequency is zero.

12. A radio receiver as claimed in claim 6, comprising control means operable to invoke a single-channel-at-a-time reception mode in response to receiving a predetermined message.

13. A radio receiver as claimed in claim 6, further comprising control means (16) for selecting for further processing a signal from among a plurality of simultaneously received signals.

14. An integrated circuit comprising a receiver as claimed in claim 6.

15. A transceiver comprising a receiver as claimed in claim 6.

16. The method of claim 1, wherein a hop rate of said first sequence differs from that of said second sequence.

17. A method of synchronizing hop sequences of frequency hopping radio transceivers, comprising
    transmitting from a first transceiver a first message at least once on each of a first plurality of radio channels selected sequentially according to a first sequence at a first rate;
    sequentially selecting, from a second plurality of radio channels according to a second sequence at a second rate, different combinations of radio channels, of which a current combination is one, the first and second plurality of radio channels having at least partial commonality;
    receiving, in a second transceiver, simultaneously on the radio channels of said current combination; and,
    in response to receiving at the second transceiver the first message on any of the second plurality of radio channels, transmitting from the second transceiver a second message and aligning hop sequences of the first and second transceivers.

* * * * *